United States Patent
Rudelic

(10) Patent No.: US 7,035,987 B2
(45) Date of Patent: Apr. 25, 2006

(54) MANAGING STORAGE IN PROCESSOR-BASED SYSTEMS

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 10/188,624

(22) Filed: Jul. 2, 2002

(65) Prior Publication Data

US 2004/0006673 A1    Jan. 8, 2004

(51) Int. Cl.
*G06F 12/02*    (2006.01)
(52) U.S. Cl. .................... 711/170; 711/103
(58) Field of Classification Search ............ 711/154, 711/103, 118, 165, 101, 170; 257/3
See application file for complete search history.

(56) References Cited

U.S. PATENT DOCUMENTS

| | | | |
|---|---|---|---|
| 5,296,716 A * | 3/1994 | Ovshinsky et al. ............ 257/3 |
| 5,574,907 A * | 11/1996 | Jernigan et al. ............... 707/1 |
| 5,930,828 A * | 7/1999 | Jensen et al. ............... 711/170 |
| 6,670,628 B1 * | 12/2003 | Lee et al. ..................... 257/4 |
| 6,738,873 B1 * | 5/2004 | Saltz .......................... 711/154 |
| 6,763,440 B1 * | 7/2004 | Traversat et al. ........... 711/159 |
| 6,804,763 B1 * | 10/2004 | Stockdale et al. .......... 711/170 |
| 6,839,823 B1 * | 1/2005 | See et al. ................... 711/171 |
| 2002/0073283 A1 * | 6/2002 | Lewis et al. ................ 711/133 |
| 2002/0129191 A1 * | 9/2002 | DaCosta ...................... 711/103 |

OTHER PUBLICATIONS

Microsoft Press "Computer Dictionary, Second Edition", 1994, pp. 175 and 195.*

* cited by examiner

*Primary Examiner*—Gary Portka
(74) *Attorney, Agent, or Firm*—Trop, Pruner & Hu, P.C.

(57) ABSTRACT

The same storage may be utilized to store both persistent and dynamic data in a processor-based system. In some embodiments, the storage may be a phase change memory. When data is to be stored, the memory manager determines whether the data is persistent. If the data is persistent it is managed in a fragmented fashion. Non-persistent or dynamic data is managed as a heap.

16 Claims, 2 Drawing Sheets

MANAGING STORAGE IN PROCESSOR-BASED SYSTEMS

BACKGROUND

This invention relates generally to processor-based systems and to a memory manager for managing the allocation of a semiconductor memory.

Current processor-based systems maintain persistent data and persistent data structures in flash memory while run time data, data queues and index tables are maintained in random access memory. Maintaining the run time data in random access memory results in a system that loses critical information in the event of a power loss event.

Thus, there is a need for better ways to manage data storage in processor-based systems.

DETAILED DESCRIPTION

Figure 1:
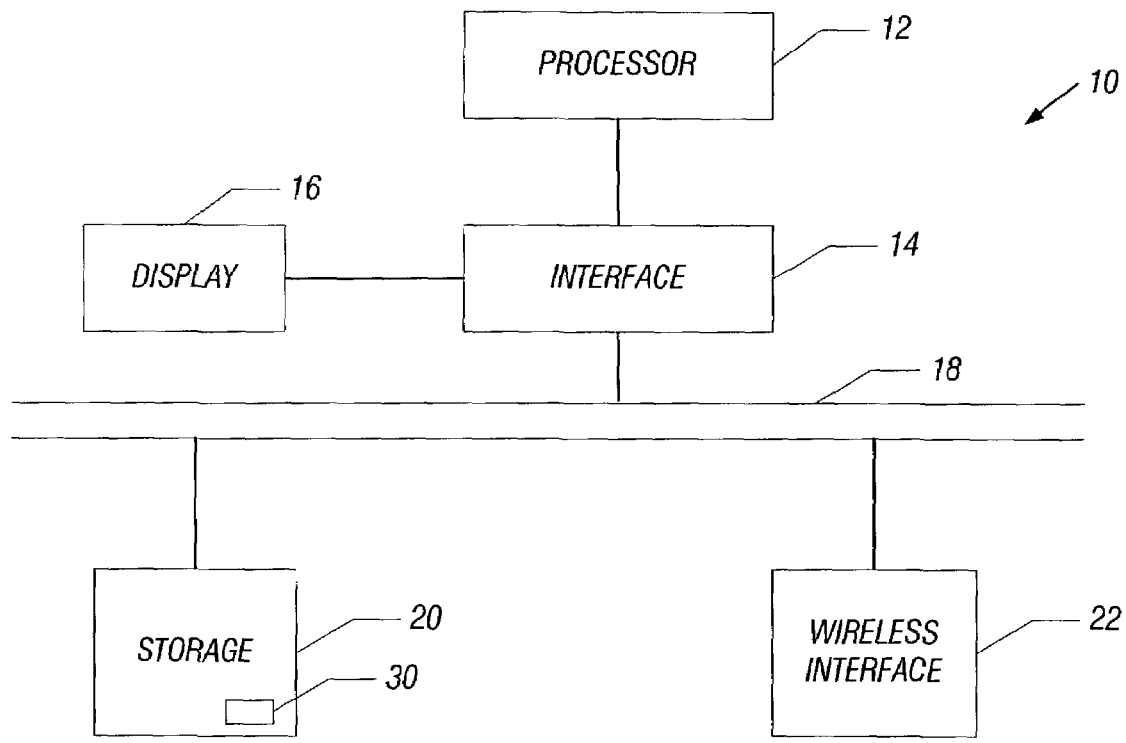
FIG. 1 is a schematic depiction of a processor-based system in accordance with one embodiment of the present invention.

Referring to FIG. 1, a processor-based system 10 may include a processor 12 coupled to an interface 14. The interface 14 in one embodiment may be a bridge. The interface 14 may be coupled to a display 16. The interface 14 may also be coupled to a bus 18. The bus 18, in turn, may be coupled to a non-volatile storage 20. In one embodiment of the present invention, the storage 20 may be a semiconductor memory. One advantageous semiconductor memory uses a phase change material. The bus 18 may be coupled to other bus devices such as a wireless interface 22.

Figure 2:
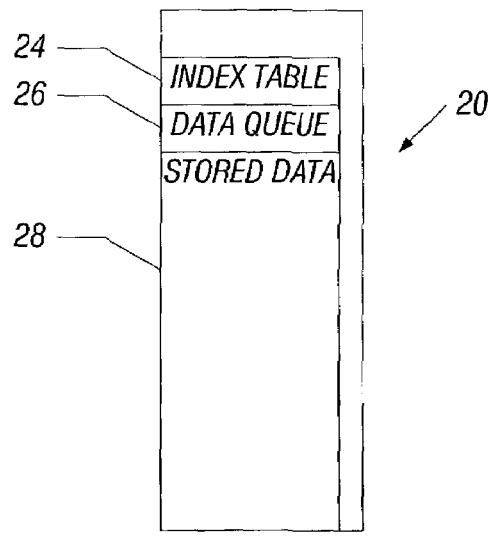
FIG. 2 is a schematic depiction of a data organization for the storage shown in FIG. 1 in accordance with one embodiment of the present invention.

The manager software 30 may be stored in the storage 20 in one embodiment of the present invention. The manager software 30 may maintain the persistent data and run time data in the same storage 20 as indicated in FIG. 2. Maintaining the run time data and persistent data in the same storage 20 allows the manager software 30 to maintain the media management operation through a power loss event. Similarly, maintaining all the run time data adjacent to the persistent data allows the manager software 30 to dynamically balance the resources between run time data and persistent data. A manager software 30 configured as such would not require any system random access memory.

Referring to FIG. 2, the storage 20 may include an index table 24, a data queue 26, and the stored data 28. The stored data 28 may include both run time data and persistent data.

An additional advantage of some embodiments of the present invention is the ability to match the memory allocation mechanism with the type of data, be it persistent or dynamic data, being stored. Persistent data may be managed in a fragmented fashion. Fragmenting the persistent data may result in a more efficient storage mechanism in some embodiments. Overhead may be added to the persistent data to support rigorous power loss data recovery in some embodiments. This approach may be consistent with the lower utilization and less dynamic nature of persistent data.

Dynamic data, on the other hand, may be managed as a heap. The heap mechanism aligns with the nature of the dynamic data. Heap mechanisms support high utilization of dynamically allocated/deallocated data with relatively low overhead for performance purposes in some embodiments.

Figure 3:
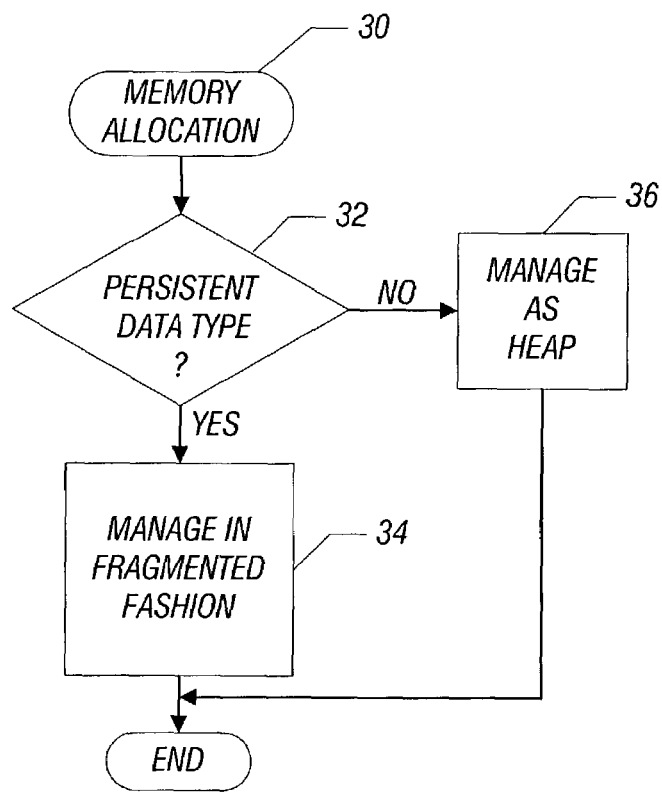
FIG. 3 is a flow chart for software in accordance with one embodiment of the present invention.

Thus, referring to FIG. 3, a check at diamond 32 determines whether data being stored is persistent data. If so, it is managed in a fragmented fashion as indicated in block 34. Conversely, if it is not persistent data, then the data being stored may be managed as a heap as indicated in block 36.

Figure 4:
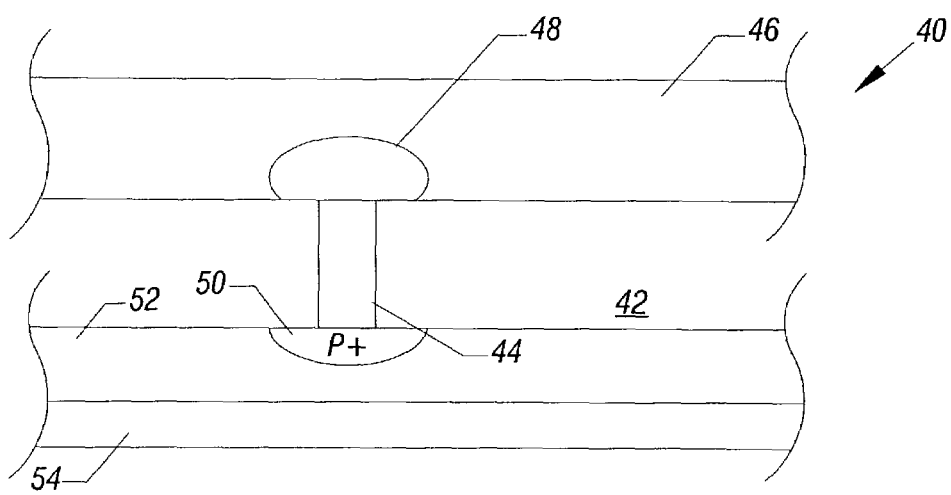
FIG. 4 is an enlarged cross-sectional view of one embodiment of the present invention.

Referring to FIG. 4, in one embodiment of the present invention the non-volatile storage 20 may be implemented using a phase change material memory. The phase change memory may include a cell 40 formed of a polycrystalline chalcogenide material 46 over a semiconductor substrate 42. A resistive electrode 44 coupled to a signal within the substrate 42 may apply heat to a programmable volume 48 of the chalcogenide material 46. The electrical energy forms heat that converts the phase change material between crystalline or conductive and amorphous or resistive phases. The cell may then be read by measuring resistance.

A signal may be applied to the heater 44 through a tub 50 that may be formed of a P+ type material in one embodiment. The tub 50 may be formed in an N-type material 52 over a P-type material 54 in one embodiment of the present invention. A metal interconnect (not shown) may be applied over the chalcogenide material 46 in one embodiment of the present invention.

The phase change material memory may be particularly advantageous as a storage 20 because of its relatively high capacity. The phase change material memories are non-volatile allowing direct overwriting, high density, and a non-destructive read.

A processor-based system may comprise a processor and a storage to store both persistent and non-persistent data in the same storage. The system does not include a volatile storage in one embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining whether data to be stored in a non-volatile memory is persistent data;
   determining whether to store the data in a heap depending on whether the data to be stored in the non-volatile memory is persistent or non-persistent data; and
   if the data to be stored is not persistent data, managing the data as a heap.

2. The method of claim 1 including storing the data in fragmented fashion if the data to be stored is persistent data and managing the data as a heap of the data to be stored is not persistent data.

3. The method of claim 2 including storing the persistent and non-persistent data in the same storage.

4. The method of claim 3 including storing data without using a volatile storage.

5. The method of claim 3 including storing said data on a phase change material memory.

6. The method of claim 1 including storing the data in fragmented fashion if the data to be stored is persistent data and managing the data as a heap of the data to be stored is not persistent data.

7. A processor-based system comprising:
a processor to determine whether to store data in a heap depending on whether the data is persistent or non-persistent;
a non-volatile storage to store both persistent and non-persistent data, and to store non-persistent data in a heap; and
a wireless interface coupled to said processor.

8. The system of claim 7 wherein said system does not include a volatile storage.

9. The system of claim 7 wherein said storage is a phase change material storage.

10. The system of claim 7 wherein said storage stores instructions that enable the processor to determine whether data to be stored is persistent data, if the data being stored is persistent data, store the data in fragmented fashion, and if the data to be stored is not persistent data, manage the data as a heap.

11. The system of claim 7 wherein said storage stores an index table, a data queue, and stored persistent and non-persistent data.

12. The system of claim 11 wherein said non-persistent data includes run time data.

13. A computer readable medium storing instructions that, if executed, enable a processor-based system to perform the steps of:

determining whether data to be stored in a non-volatile memory is persistent data;

determining whether to store the data in a heap depending on whether the data to be stored in the non-volatile memory is persistent or non-persistent data; and if the data to be stored is non-persistent data, managing the data as a heap.

14. The medium of claim 13 further storing instructions that, if executed, enable the processor-based system to perform the step of storing the persistent and non-persistent data in the same storage.

15. The medium of claim 14 further storing instructions that, if executed, enable the processor-based system to perform the step of storing data without using a volatile storage.

16. The medium of claim 14 further storing instructions that, if executed, enable the processor-based system to perform the step of storing said data on a phase change material memory.

* * * * *